United States Patent [19]

Rosman

[11] Patent Number: 4,761,954

[45] Date of Patent: Aug. 9, 1988

[54] FORK-LIFT SYSTEM

[75] Inventor: Alan H. Rosman, Woodland Hills, Calif.

[73] Assignee: Dynamic Hydraulic Systems, Inc., Canoga Park, Calif.

[21] Appl. No.: 26,181

[22] Filed: Mar. 16, 1987

[51] Int. Cl.[4] .............................................. F16D 31/02

[52] U.S. Cl. ....................................... 60/414; 60/372; 60/416; 60/418; 60/464; 91/461

[58] Field of Search ................. 60/464, 369, 371, 372, 60/381, 413, 414, 416, 418, 423; 91/420, 459, 461

[56] References Cited

U.S. PATENT DOCUMENTS

| | | | |
|---|---|---|---|
| 3,747,351 | 7/1973 | Wilkerson et al. | 60/476 |
| 3,908,515 | 9/1975 | Johnson | 91/437 X |
| 3,939,656 | 2/1976 | Goldfein | 60/464 X |
| 4,188,787 | 2/1980 | Bromell et al. | 60/416 X |
| 4,546,607 | 10/1985 | Kime | 60/372 |
| 4,573,319 | 3/1986 | Chichester | 60/423 X |
| 4,631,918 | 12/1986 | Rosman | 60/372 |

*Primary Examiner*—Edward K. Look

*Attorney, Agent, or Firm*—Hopgood, Calimafde, Kalil, Blaustein & Judlowe

[57] ABSTRACT

A battery-operated electric-motor driven hydraulic-lift mechanism for a fork-lift vehicle employs a hydraulic accumulator which serves an intertia-free counterweight function, designedly to the degree that such counterweight action is a direct offset of a predetermined average-load condition, as seen by the hydraulic-lift actuator of the system. Electric-motor drive is utilized for up/down operation of the fork lift, only to the extend needed to displace hydraulic fluid into or out of the "counterweighted" actuator. In some cases, such displacement will call for expending energy to add to or substract from the counterweight action; in other cases, the necessary fluid displacement results in an energy return to the system, i.e., in restoring energy to the battery.

7 Claims, 1 Drawing Sheet

FORK-LIFT SYSTEM

BACKGROUND OF THE INVENTION

The invention relates to fork-lift application of hydraulic-lift systems of the variety disclosed in my copending application Ser. Nos. 570,590, filed Jan. 13, 1984, now abandoned and Ser. No. 601,481, filed Apr. 18, 1984, now U.S. Pat. No. 4,715,180, which applications are incorporated by reference. More particularly, the invention relates to battery-operated electric-motor driven hydraulic means for selective intermittent up/-down manipulation of the lift platform of a fork-lift vehicle.

In conventional fork-lift vehicles which rely upon electric-motor drive of a hydraulic-lift system, the electric motor and its battery are designed and configured with capacity to sustain maximum loads. The motor drives a fixed-delivery hydraulic pump, and therefore the current drain on the battery, at start of a load-lifting procedure, can be as much as three or more times the current consumption for normal running. The conventional motor is series-wound, operating fast at low loads and slow at high loads, in a very inefficient manner. When approaching a target elevation in an upward stroke, speed is controlled by restricting flow to the hoisting cylinder, the remainder of the flow being discharged at maximum pressure to sump, via a relief valve; further discharge to sump is involved in the course of a downward stroke. Not only are such convenventional systems grossly wasteful of energy, but they are unnecessarily damaging to the battery, in that large surges of current drain are a fact of life, resulting in need for frequent recharging and in accelerated destruction of the battery; beyond the magnitude of the surge, heavy current surges have a negative effect on battery life, due to the chemical nature of the battery action and to the lower efficiency which necessarily accompanies such surges. Stored battery energy must do all the lifting, and such potential energy as is available after lifting a load is discarded, by release of hydraulic fluid to sump, for a controlled descent of the loaded fork.

BRIEF STATEMENT OF THE INVENTION

It is an object of the invention to provide an improved electric-motor driven hydraulic fork-lift system.

Another object is to meet the above object with such enhanced efficiency, as to vastly increase the life of a given fork-lift battery.

A further object is to provide a fork-lift system of the character indicated wherein substantially reduced horsepower is required of the electric motor and in which recharging of the battery is less frequent.

The invention achieves these objects in a hydraulic-lift system wherein a hydraulic accumulator serves an inertia-free counterweight function, designedly to the degree that such counterweight action is a direct offset of a predetermined average-load condition, as seen by the hydraulic-lift actuator of the system. Electric-motor drive is utilized for up/down operation of the fork lift, only to the extent needed to displace hydraulic fluid into or out of the "counterweighted" actuator. In some cases, such displacement will call for expending energy to add to or substract from the counterweight action; in other cases, the necessary fluid displacement results in an energy return to the system, i.e., in restoring energy to the battery.

DETAILED DESCRIPTION

Figure 1:
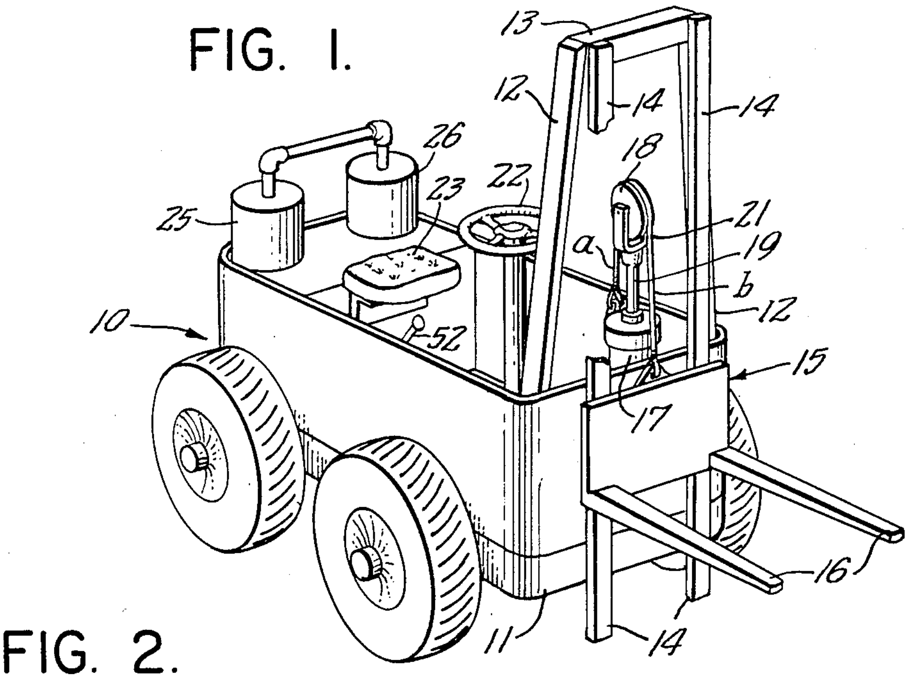
Figure 2:
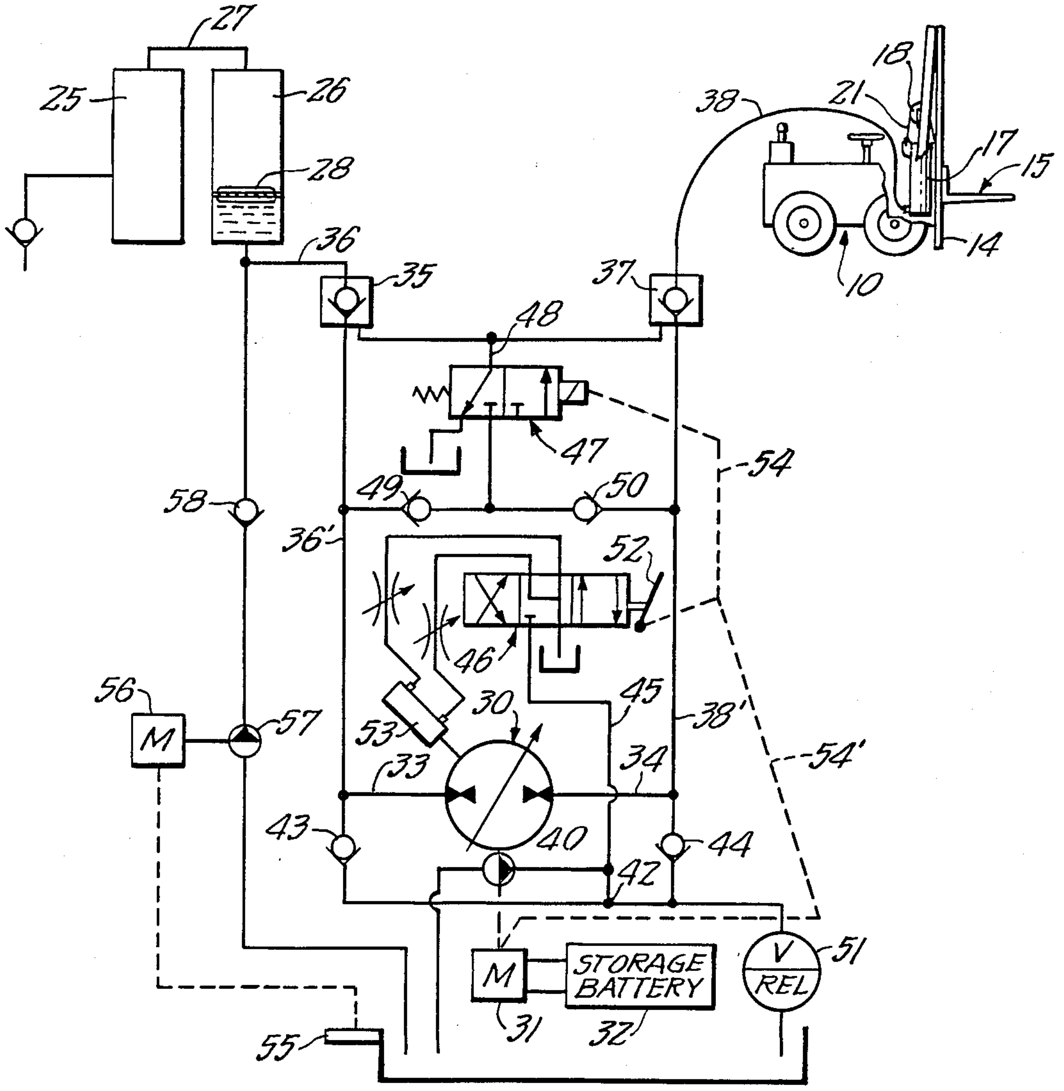

The invention will be illustratively described for a preferred embodiment, in conjunction with the accompanying drawings. In said drawings:

FIG. 1 is a simplified and partly broken-away view in perspective of a fork-lift vehicle embodying the invention; and FIG. 2 is a schematic diagram of circuitry involved in lift mechanism of the vehicle of FIG. 1.

In the four-wheeled fork-lift vehicle 10 of FIG. 1, a chassis 11 rigidly supports upstanding frame members 12 having overhead interconnection 13 and providing rigid substantially vertical parallel alignment of spaced guides 14 for a lift slide 15. Lifting fork arms 16 extend horizontally forward and are rigid with the lower end of slide 15. Hoist mechanism for up/down positioning of slide 15 is shown to comprise a single-acting hydraulic thrusting cylinder 17, secured (by means not shown) to chassis 11, and having a cable sheave 18 at the projecting upper end of its piston rod 19. A lift cable 21 is tied at one end to cylinder 17 (and, therefore, to the frame); it has a first course a upward to and around sheave 18, and a second course b downward to the point of suspending connection to slide 15; cable 21 will be understood as a simplified schematic showing of a sprocket chain. Floor-positioning control and drive of the vehicle 10 are not part of the invention and are therefore not shown, beyond the suggestiveness of steering control and operator seating at 22-23, respectively.

It is a feature of the invention that hydraulic accumulator means shall provide an essentially inertiafree counterweight function, in offset not only of the deadweight value of the forked slide 15 but also to the additional extent of a predetermined value which reflects average payload carried by slide 15. In the form shown, two large cylinders 25-26 are interconnected (at 27) to provide the hydraulic accumulator. In FIG. 2, a floating piston 28 within cylinder 26 provides sealed isolation of hydraulic fluid (beneath piston 28), from pressurized gas such as nitrogen, within the remaining volume of cylinders 25-26. Preferably, the volume of pressurized gas in cylinders 25-26 very substantially exceeds, e.g., by at least 10 times, the volume of hydraulic fluid self-contained within hydraulic circuitry of the lift system, and the maximum volume of hydraulic fluid accommodated in the accumulator exceeds to a small extent the total volumetric displacement within thrusting cylinder 17 in the course of the maximum stroke of its piston rod 19.

Briefly stated, the hydraulic circuit for operation of actuator 17 involves use of a substantially constant volume of hydraulic fluid which, through the directional operation of a power integrator 30, is displaced from the accumulator to the actuator, or from the actuator to the accumulator, depending upon the selected direction of lift-slide (15) displacement in elevation. The power integrator is a variable-flow device which may be driven by an electric motor 31 that is supplied by storage-battery means 32 on the vehicle. Preferably, motor 31 is of the shunt-wound or of the compound-wound variety, for purposes of serving motor and generator functions.

As explained in said copending applications, the power integrator 30 is a rotary liquid-displacement device having two spaced flow-connection ports 33-34 and an interposed rotor, which is driven by motor 31, and the expression "rotary" as used herein in connection with such a device is to be understood as including various known rotary-pump structures, such as gear-pump and sliding-vane devices, as of the "over-center" variety disclosed in said application Ser. No. 601,481, as well as axially reciprocating and radially reciprocating configurations, wherein rotor-shaft rotation is related to hydraulic flow into one port and out of the other port, in accordance with tilt of a swash-plate. In other words, for purposes of the invention, such "rotary" devices provide for such hydraulic flow, and they provide for an external input/output torque-response relation to the hydraulic flow. In the present case, to minimize the relatively high current consumption which goes with reversibly driving the rotor of the power integrator, the motor 31 is driven in a single direction, and the power integrator is relied upon to govern (a) the zero-flow condition as well as (b) the direction and rate of port-to-port hydraulic flow.

In FIG. 2, the basic self-contained hydraulic circuitry relies on a first pilot-operated check valve 35 in a line 36-36' connecting integrator port 33 to the hydraulic end of cylinder 28 of the hydraulic accumulator, and a second pilot-operated check valve 37 is in a line 38-38' connecting integrator port 34 to the lift actuator 17. Both check valves 35-37 are oriented, when not pilotoperated, to check against hydraulic flow in their respective lines 36-38 toward the power integrator.

Circuitry to operate the pilots of check valves 35-37 includes a low-capacity pump 40 which is driven by motor 31 and which draws fluid from a sump 41 to a point 42 of supply connection to back-to-back check valves 43-44 which may discharge to lines 36'-38', if necessary. Pump 40 also supplies pressure-fluid in a line 45 to a servo valve 46, which will later be explained in connection with control of the power integrator 30. To the extent that the low-capacity output of pump 40 is not needed, a relief valve 51 returns this small excess flow to sump 41. A solenoid valve 47 is normally positioned as shown to discharge to sump a control line 48 which serves for operating the pilots of the respective valves 35-37; when solenoid-actuated, valve 47 draws upon pressure fluid from one or the other of lines 36'-38' (via back-to-back check valves 49-50) and thus full accumulator pressure is available to hold both valves 35-37 in open condition, as long as integrator 30 is effecting or regulating fluid displacement from one to the other of the end devices 26-17 of the actuating circuit.

The servo valve 46 is shown to have three operative positions, all in accordance with the selected position of a manual control handle 52, which is shown in FIG. 1 to be conveniently accessible to the operator of the vehicle. The servo valve 46 has control connections to the respective ends of a double-acting actuator 53 for control of pump 30, e.g., in the case of a swash-plate governed pump, or positioning the tilt aspect of the swash plate. In the mid-position or neutral condition of valve 46, pressure fluid supplied by pump 40 is cut off, and the swash plate of pump 30 will be understood to be urged by return-spring means (not shown) into neutral position, as permitted by orifice settings which determine the rate at which the swash plate will be permitted to return to its neutral position, with drainage to sump from one or the other end of actuator 53. A shift of handle 52 in one direction determines one direction of pressure-fluid supply to actuator 53 and therefore one direction of swash-plate tilt, and a shift in the opposite direction similarly determines the opposite direction of swash-plate tilt.

Dashed lines 54-54' will be understood to suggest means whereby any actuation of handle 52 away from neutral position will automatically actuate the solenoid valve 47 from its normally closed condition (shown) to its open condition, and to start motor 31. In the open condition of valve 47, hydraulic pressure of fluid drawn by pump 40 is supplied to actuate the pilots of valves 35-37 (being preferably of barrier-type), thus placing the reversible displacement pump 30 in open communication with actuator 17 and accumulator 26. If the direction of handle-52 displacement is such as to move hydraulic fluid from the accumulator (via lines 36-38) to actuator 17, the latter will upwardly thrust sheave 18 13-18 and thus raise the lift slide 15 and its load; and if handle 52 is displaced the other side of neutral, hydraulic fluid will be displaced from actuator 17 to accumulator 26, for a controlled descent of the lift slide 15 and its load. Upon re-centering the handle back to its neutral position, motor 31 is deenergized and the solenoid of valve 47 will be de-energized, allowing valve 47 to return to its "normal" position (shown), wherein pilot-operating fluid is vented to sump; this allows both check valves 35-37 to close, thus holding whatever may be the currently elevated position of lift slide 15 and its load. It should be noted that the venting of pilot-operated fluid upon return of valve 47 to its normal position involves only miniscule discharge to sump; lines 36'-38', pump 30 and all other parts of the control system remain filled with hydraulic fluid, even though the prime mover (motor 31) is switched off. The hydraulic control connections remain at pilot-operating pressure, in instant readiness for an opening actuation of the pilot-operated valves 35-37 as soon as valve 47 is actuated upon displacement of handle 52 away from its neutral position.

It will be seen that the described actuating circuitry is essentially self-containing of its operating hydraulic fluid. There is, a very slight discharge of such fluid to sump upon each repositioning of servo valve 46 to neutral position, it being understood that all sump symbols, e.g., for valves 46 and 47, communicate with sump 41. However, fluid that is thus returned is automatically recycled back into the self-containing circuit, by reason of float or other level-sensitive switching means 55 and its intermittent control of a motor 56 for a pump 57, shown for occasional operation to return fluid via a check valve 58 to the hydraulic end of accumulator 26.

The decribed invention will be seen to achieve all stated objects and to produce results having singular significance for a battery-operated situation, such as an electric-motor driven fork-lift vehicle. Important economies result by reason of the hydraulic accumulator, meaning an installed electric-motor capacity requirement which is approximately one-third that required for conventional construction. Further economies flow from avoidance of heavy surges of load-lifting current, and from the inherent ability of the described system to return energy for battery storage, as when the counterweight action of the hydraulic accumulator exceeds the energy requirement for a particular displacement. In a conventional fork-lift, the effect of speed control is to increase current consumption at lower speeds; but with the invention, current consumption is not only at the significantly reduced levels attributable to hydraulic counterweighting, but is also proportional to speed.

While the invention has been described for a preferred emobiment, it wil be understood that modifications can be made without departing from the scope of the invention. For example, the particular cable courses, a and b are merely illustrative, in that multiple reaving, or other sprocket-chain suspension, or other means may be employed to translate rod-19 displacemtn into lift-slide (15) displacement.

What is claimed is:

1. In a fork-lift vehicle, wherein a battery-operated electric motor is relied upon for selective up/down positioning drive of a fork-lift slide having a predetermined span of operational displacement along upstanding guides, the improvement in which a single-acting hydraulic-hoist actuator is connected for direct up/-down positioning of the slide and in which said actuator and a hydraulic accumulator and a power integrator are interconnected as a fluid-conserving hydraulic system, said power integrator being a liquid-displacement device and having first and second ports respectively connected to said actuator and to said accumulator, a volume of hydraulic fluid self-contained within the included volume of said actuator and integrator and accumulator to the extent at least sufficient to enable operation of said actuator for more than said span, said accumulator having a volume substantially in excess of said hydraulic-fluid volume and said actuator being under gas pressure at a level at least more than sufficient to balance a load in excess of a deadweight-load condition on said actuator; a first pilot-operated check valve in the port connection to said actuator and a second pilot-operated check valve in the port connection to said accumulator, each of said check valves being oriented to check flow in the direction toward said integrator, and said integrator further including rotatable means having a torsionally responsive relation to port-to-port flow through the integrator and said rotatable means having a shaft connection to said electric motor; and control means including a motor-driven connection and fluid-pressure operated means responsive to liquid displacement by said rotary device and connected to both of the respective pilots of said check valves, whereby regardless of the direction of liquid displacement by said device, both pilot-operated check valves will be opened by pilot action and will remain open, and fluid pressure will be applied to both of the respective pilots of said pilotoperated check valves, during all up or down operations of said fork-lift slide.

2. The improved fork-lift vehicle of claim 1, in which said electric motor is shunt-wound.

3. The improved fork-lift vehicle of claim 1, in which said electric motor is compound wound.

4. The improved fork-lift vehicle of claim 1, in which said power integrator is an overcenter hydraulic pump that is adjustable to govern a first direction of port-to-port flow on one side of center and an opposite direction of port-to-port flow on the other side of center and zero flow at its center position, and in which said control means is operative to adjust said pump.

5. The improved fork-lift vehicle of claim 1, in which said power integrator is a hydraulic pump having a tiltable swash plate, and in which said control means is operative to adjust the tilt of said swash plate.

6. In a fork-lift vehicle, wherein a battery-operated electric motor is relied upon for selective up/down positioning drive of a fork-lift slide having a predetermined span of operational displacement along upstanding guides, the improvement in which a single-acting hydraulic-hoist actuator is connected for direct up/-down positioning of the slide and in which said actuator and a hydraulic accumulator and a power integrator are interconnected as a fluid-conserving hydraulic system, said power integrator being a liquid-displacement device and having first and second ports respectively connected to said actuator and to said accumulator, a volume of hydraulic fluid self-contained within the included volume of said actuator and integrator and accumulator to the extent at least sufficient to enable operation of said actuator for more than said span, said accumulator having a volume substantially in excess of said hydraulic-fluid volume and said actuator being under gas pressure at a level at least more than sufficient to balance a load in excess of a deadweight-load condition on said actuator; a first pilot-operated check valve in the port connection to said actuator and a second pilot-operated check valve in the port connection to said accumulator, each of said check valves being of the barrier variety and oriented to check flow in the direction toward said integrator, and said integrator further including rotatable means having a torsionally responsive relation to port-to-port flow through the integrator and said rotatable means having a shaft connection to said electric motor; and control means including a motor-driven connection and fluid-pressure operated means responsive to liquid displacement by said rotary device and connected to both of the respective pilots of said check valves, whereby regardless of the direction of liquid displacement by said device, both pilot-operated check valves will be opened by pilot action and will remain open, and fluid pressure will be applied to both of the respective pilots of said pilot-operated check valves, during all up or down operations of said fork-lift slide.

7. The improvement of claim 1 or claim 6, in which said fluid-pressure operated means comprises connected back-to-back check valves in separate lines of connection to the respective ports of said power integrator, a pressure-fluid connection including a solenoid valve between the back-to-back connection and the respective pilots of said pilot-operated check valves, said solenoid valve having one state determining admission of pilot-operating fluid pressure to said pilots and another state determining relief of pilot-operating fluid pressure from said pilots, and control means governing said solenoid valve in said one state while liquid is displacing through said power integrator and in said other state in the absence of liquid displacement through said power integrator.

* * * * *